March 3, 1959  G. T. McCLELLAN  2,876,016

SHIPPING UNIT CONVERTIBLE TO A HIGHWAY TRAILER

Filed July 8, 1957  2 Sheets-Sheet 1

INVENTOR
George T. McClellan

BY Mason, Fenwick & Lawrence
ATTORNEYS

March 3, 1959

G. T. McCLELLAN 2,876,016

SHIPPING UNIT CONVERTIBLE TO A HIGHWAY TRAILER

Filed July 8, 1957

INVENTOR
George T. McClellan

BY Mason, Fenwick & Lawrence
ATTORNEYS

United States Patent Office 2,876,016
Patented Mar. 3, 1959

2,876,016

SHIPPING UNIT CONVERTIBLE TO A HIGHWAY TRAILER

George T. McClellan, Vienna, Va.

Application July 8, 1957, Serial No. 670,421

4 Claims. (Cl. 280—30)

This invention relates to shipping units for the rapid transportation of merchandise, and more particularly to the conversion of such units from a conveyor in which the merchandise is transported over highways to a shipping container for use in transportation of the merchandise by other modes of transportation such as by airplane, steamship, railroad and the like.

In the transportation of perishable foodstuffs which must be kept frozen or refrigerated, it is important to eliminate as far as possible any unnecessary delay in shipment, as well as unnecessary handling. Shipments of fresh fruit to distant countries by known methods of handling involve picking of the fruit and transportation in boxes or in bulk to a storehouse where it is kept at a reduced temperature. The fruit is then graded and packed in boxes or baskets and stored at a reduced temperature until shipment is to be made. The storehouse is usually convenient to the grower and more often than not is served only by highway transportation. Where the fruit is to be shipped to a distant country, it is first loaded on a refrigerated tractor-trailer and transported to the nearest railroad terminal having facilities for storing fruit at a reduced temperature, and unloaded. It is then loaded into iced or refrigerated railroad cars and transported to the nearest port where it is again unloaded and stored in a refrigerated storehouse until it can be loaded on board a ship. In addition to the high labor cost during change from one mode of transportation to another, there is a good chance that the facilities at each juncture in the trip will not be adequate for making the transfer under ideal conditions for the preservation of the fruit.

The present invention is directed to the elimination of the expense and hazards attendant shipments of perishable foodstuffs by several modes of transportation occasioned by unloading the foodstuff from one type of transportation vehicle and loading it on another. With the present invention, fresh fruit would be packed in boxes by the grower and loaded but one time into a reduced temperature vehicle and shipped to a storehouse in a distant country. The highway vehicle itself will become the shipping container and temporary storehouse during transportation by highway, railroad, airplane or steamship, as well as for highway travel in the distant country. In the case of frozen foodstuffs, the shipment would be made directly from the frozen food processing plant in one temperature-conditioned container to a storehouse in a distant country.

Consequently, it is an object of the present invention to provide a self contained shipping unit which can be moved over highways as a trailer and have its highway gear quickly removed to convert it into a shipping container for other modes of transportation.

It is a further object of the present invention to provide the above shipping unit with permanent anti friction devices which are sturdy and recessed to minimize the likelihood of damage during handling, so that the shipping unit may be readily moved onto and about the vehicles used for the mentioned modes of transportation other than by highway.

Other objects will become apparent as the description of a practical embodiment of the invention proceeds when read in conjunction with the accompanying drawings, in which.

Figure 1:
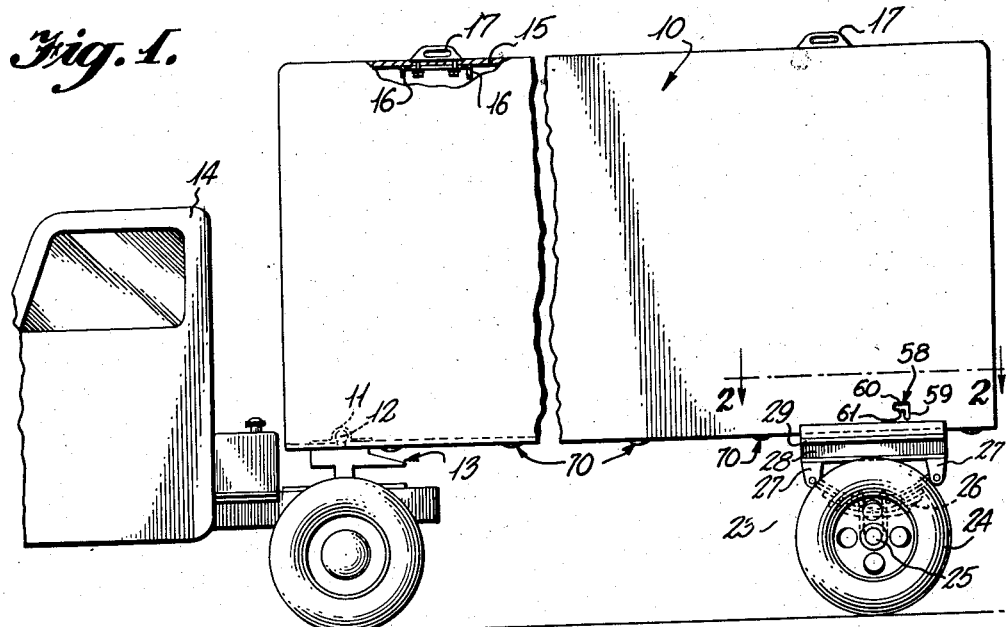
Figure 1 is a side elevation of the shipping unit of the present invention, shown in conjunction with a portion of the prime mover for highway transportation with the central portion of the shipping unit being broken away.

Adverting now to the drawings, and particularly to Figure 1, a shipping unit 10 is shown equipped for highway transportation. The shipping unit 10 generally takes the form of a trailer body, having a slot over which there is positioned a socket 11 to receive the pin 12 of the fifth wheel assembly 13 of a tractor 14. Steel or aluminum alloy plate 15 is preferably used for the outer skin of the shipping unit 10, and it is welded or riveted to suitable angle iron framing members indicated at 16. The slotted handle bolts 17 are fastened to the top of the unit 10, for attachment of hoist cables to swing the unit onto a flatcar, or aboard a ship. The handle bolts 17 are anchored through the plate 15 to the framework of the unit 10.

As stated, the shipping unit 10 is to be a highway vehicle, namely, a trailer, to be drawn by a tractor, and for this purpose the unit 10 has a detachably connected wheel assembly 23 mounted near the rear of the unit.

The wheel assembly 23 comprises the usual rubber tired wheels 24, mounted on an axle 25, attached to the springs 26 which in turn are suspended between pairs of spring hangers 27 dependingly attached to the beam members 28 to support the platform plate 29.

Since maintenance crews are ordinarily not available at all transfer points, it is important that the means for connecting and disconnecting the wheel assembly 23 from the shipping unit 10 be made as foolproof as possible and with a minimum of exposed mechanism. Since hoist mechanism, such as a crane is used for lifting and swinging the shipping unit 10 aboard ship or onto a railroad car, the shipping unit must be sturdy enough to withstand the ordinary blows and shocks attendant to such operation. The present invention contemplates providing a means for connecting the highway wheel assembly in a manner that is quick-operating, and all of the mechanism carried by the shipping unit 10 is installed within the sturdy body portion of the said unit.

Figure 2:
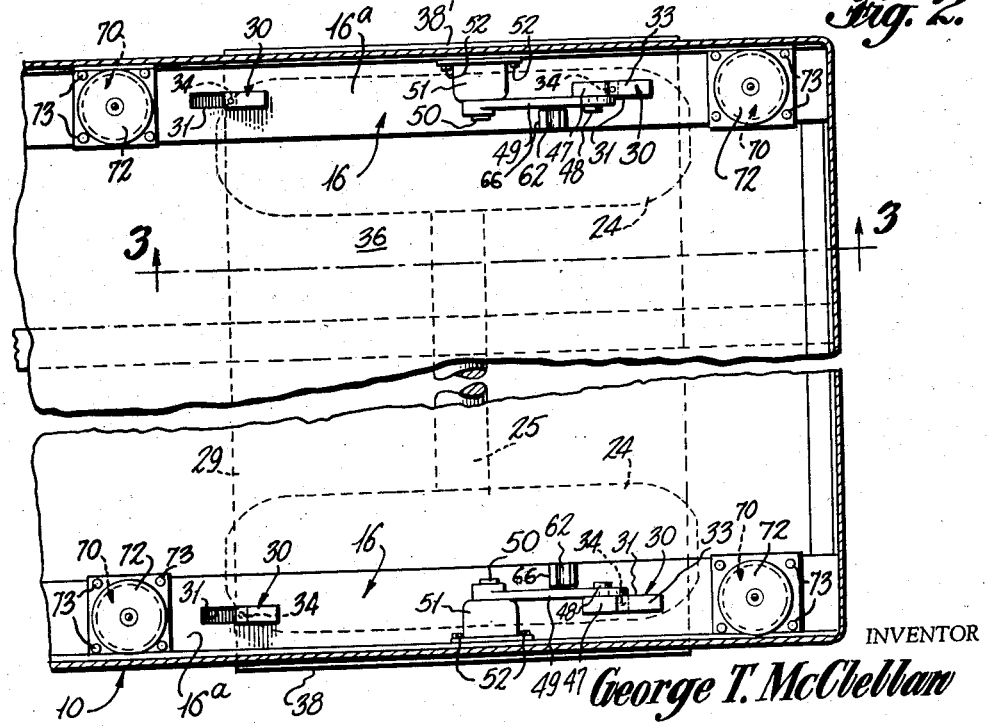
Figure 2 is a fragmentary horizontal section of the shipping unit, showing the connecting means for the detachable wheeled undercarriage, the latter being shown in dotted lines, taken on the line 2—2 of Figure 1.

Lugs or hooks 30 are installed on the wheel assembly 23 to be engaged in slots 31 of the shipping unit 10 to provide the means for quickly connecting these parts securely together. A plurality of the lugs 30 are provided on the platform plate 29. For purposes of illustrating the invention, four of the lugs 30 are shown in Figure 2 for a two-wheeled unit, but the number of such lugs to be used will depend on the size and weight of the shipping unit 10.

Figure 3:
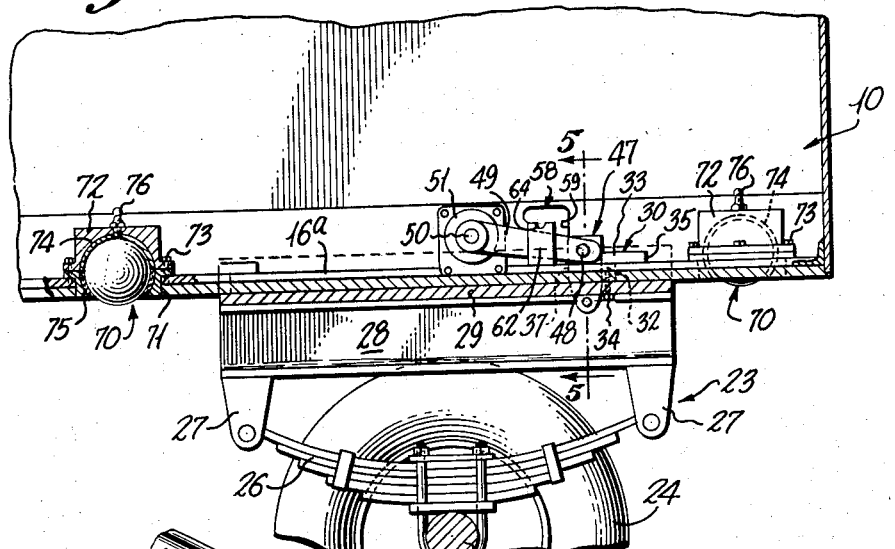
Figure 3 is a fragmentary vertical section, taken along the line 3—3 of Figure 2.

The lug 30 is formed with a vertical standard 32 and a horizontal arm 33, and is attached to the platform plate 29 by means of a bolt 34, as shown in Figure 3, or by other suitable means, such as by providing a second horizontal arm (not shown) at the base of the vertical standard 32, and welding it to the underneath side of the platform plate 29. The free end 35 of the horizontal arm 33 extends toward the rear of the wheel assembly 23 and is spaced from the platform plate 29 a distance equal to the thickness of the bottom 36 and beam 16a of the shipping unit 10. For a purpose to be later described, a keeper passageway 37 is cut longitudinally in the platform plate 29 adjacent some of the lugs 30, said passageway extending from the vertical standard 32 toward the front of the wheel assembly 23 a distance equal approximately to the length of the horizontal arm 33. The platform plate 29 is formed with the upturned side flanges 38, 38' to embrace the lower edges of the shipping unit 10 and prevent relative transverse movement between the shipping unit and the wheel assembly. The height of the flanges 38, 38' is greater than the height of the lug 30, so that the flanges 38, 38' will act as guides during the jointure of the wheel assembly and shipping unit.

As stated, the lugs 30 engage the slots 31 of the shipping unit 10. The slots 31 are cut through the bottom 36 and longitudinal angle iron frame members 16a, and are of equal number and spacing as the lugs 30. The slots 31 are formed to register with the lugs when the shipping unit is in position on the wheel assembly, and they are approximately equal in length to the lugs 30 i. e. the vertical standard 32 plus the horizontal arm 33, and of equal transverse diameter, proper tolerances being allowed for smooth jointure.

When the shipping unit 10 is lowered on the wheel assembly 23, the lugs 30 will extend upward through the slots 31, the lower face 44 of the horizontal arm 33 being approximately in the same plane as the top of the frame member 16a, and the vertical standard 32 will be adjacent the front end 45 of the slot 31. Upon moving the shipping unit in a forward direction relative to the wheel assembly, the vertical standard 32 will be moved to the opposite end 46 of the slot 31, and the horizontal arm 33 will overlie the frame member 16a, thereby securing the wheel assembly to the shipping unit. Forward pull of the tractor 14 will keep the vertical standard 32 tightly against the end 46 of the slot 31.

Figure 4:
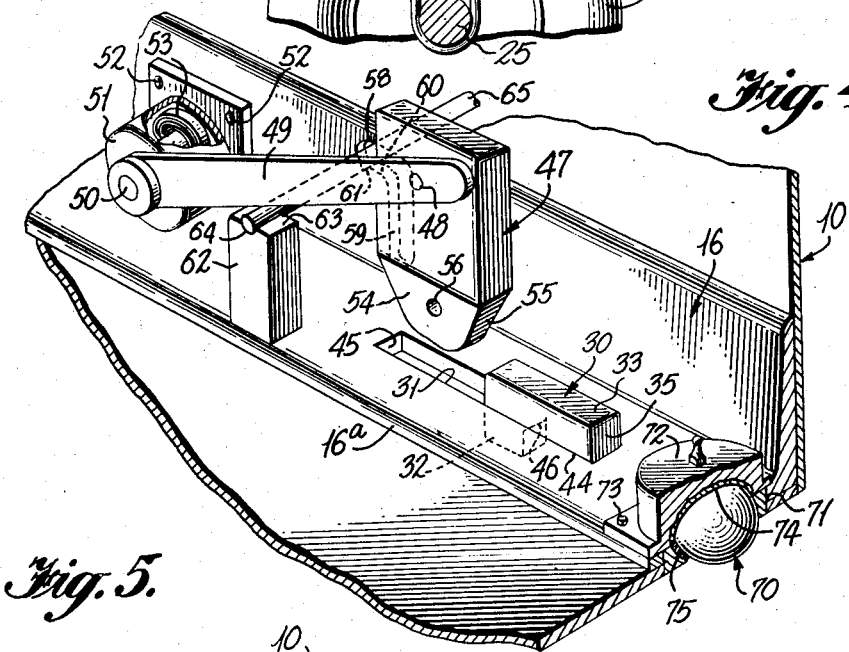
Figure 4 is a perspective view of a portion of the shipping unit illustrating the locking mechanism for the detachable wheeled undercarriage, with a part of the view in section to show one of the antifriction devices for moving the unit about after removal of the wheeled undercarriage.
Figure 5:
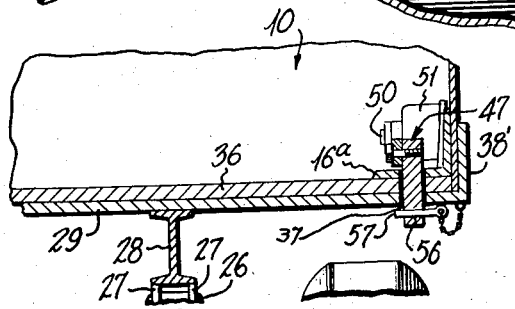
Figure 5 is a vertical transverse sectional view taken along the line 5—5 of Figure 3.

To hold the lugs 30 in locking position, a keeper 47 is movable into the slot 31. The keeper 47 is pivotally mounted at 48 on one end of a keeper arm 49. The other end of the keeper arm is journaled on a shaft 50, which in turn is journaled in a housing 51 fixed to the frame member 16a by bolts 52. Within the housing 51 a coil spring 53 is attached to the shaft 50 and housing 51 to bias the keeper 47 toward the slot 31. As shown in Figure 4, the keeper 47 is of the approximate size to fit the slot 31 when the lug 30 has been moved until the vertical standard 32 is positioned at the end 46 of the slot 31.

The keeper 47 is of a height to extend through the slot 31 and keeper passageway 37 and beyond the lower face of the platform plate 29, and has tapered sides 54 and ends 55 so that it will readily seat itself in the slot 31.

Under normal use, the spring 53 acting on the keeper arm 49 will securely hold the keeper 47 in the slot 31. However, as an added precaution, the keeper 47 may be drilled as at 56 to receive a cotter pin 57, as where the unit is to be transported over rough roads.

While a plurality of the lugs 30 and cooperating slots 31 may be used to connect the wheel assembly 23 to the shipping unit 10, only two of the keepers 47 are required, one on either side of the shipping unit. Also keeper passageways 37 are provided in the wheel assembly only at those lugs which will be secured in locked position by keepers.

To disconnect the wheel assembly 23 from the unit 10, it is desirable to provide mechanism, none of the elements of which protrude from the walls of the unit 10, and which does not require the use of special tools. To accomplish this, an inverted L-shaped keyway 58 is provided in the unit 10 adjacent the mid-point of each of the keeper arms 49, the keyways 58 being cut through the skin 15 and frame members 16a. The keyway 58 has a vertical leg 59 and a horizontal portion or plateau 60. A detent 61 is provided in the horizontal portion 60 for a purpose to be described later. A block 62, having a horizontal portion 63 and a detent 64 is fastened to the horizontal flange of the framework member 16a on the opposite side of the keeper arm 49 to that which confronts the keyway 58. The horizontal portions 60 and 63 are approximately of the same height, and a line passing through the detents 61 and 64 is normal to the keeper arm 49.

The wheel assembly 23 may be disconnected from the unit 10 by inserting a rod 65, which may be a large screwdriver, bar or the like, in the bottom portion of the vertical leg 59 of the keyway 58, and passing it under the keeper arm 49 until the end of the rod engages the side 66 of the block 62. The rod 65 is then lifted vertically, using the innermost end as a fulcrum until the rod reaches the horizontal keyway portion 60, whereupon the rod 65 is moved horizontally until it seats in the detent 61. Then using the horizontal keyway portion 60 as a fulcrum, the outer end of the rod 65 is forced downward, which raises the inner end of the rod 65 along the side 66 of the block 62 and thereby raises the keeper arm 49, lifting the keeper 47 from the slot 31. The inner end of the rod 65 is then moved horizontally along the horizontal portion 63 of the block 62 until it seats in the detent 64. In this position the rod 65 will securely hold the keeper 47 in withdrawn position. The wheel assembly 23 may then be moved relative to the shipping unit 10 until the horizontal arm 33 of the lug 30 will pass out of the slot 31; the rod 65 is removed; and the unit 10 is lifted from the wheel assembly 23 by a hoist and swing onto a flat car, boat or the like.

To protect the keeper and keeper mechanism from any cargo that may shift upon it, a suitable guard, such as an inverted steel box (not shown) may be provided.

It may be desirable to move the shipping unit 10 for stowing it within the cargo hole of a ship or airplane, or to move it on a flatcar. For this type of movement, ball casters 70 are provided at spaced intervals along the bottom of the shipping unit 10 near the edge thereof, as shown in Figures 2, 3 and 4. The ball casters 70 present a contour which would turn a direct flow, and they permit movement of the shipping unit 10 in any direction without the necessity of maneuvering the unit to make a change of direction, thereby facilitating stowing. An aperture 71 is made in the frame member 16a and skin 15 for each of the ball casters 70, the apertures having sides contoured to fit the caster. The diameter of the aperture in frame member 16a is less than the diameter of the caster. A housing 72 to encompass the upper half of the caster 70 is securely attached to the frame member 16a by the bolts 73. Seated within the upper portion of the housing is a preformed bearing 74 which may be made of any suitable material such as diamond point nylon plastic or the like, Babbitt metal, etc. A packing of felt 75 surrounds the unexposed lower portion of the caster 70 to retain grease and prevent the entry of foreign material which might damage the bearing 74. A grease fitting 76 is provided on the housing 72 to permit lubrication of the ball caster.

In use, the shipping units 10 are stored as cargo separate from the wheel assemblies 23. Where the shipping units are used on regular established routes, wheel assemblies may be provided at each end of the non-highway portion of the route, so that the wheel assemblies would not have to be transported by the non-highway carriers.

While there has been disclosed in the foregoing description a practical embodiment of a shipping unit in accordance with the present invention, it will be understood by those skilled in the art that variations in the

What is claimed is:

1. In a shipping unit convertible to and from a highway vehicle, a container having a floor, top and walls, a means for connecting the container to a tractor, a detachable wheel assembly having a seat for the container, a plurality of lug hooks on said wheel assembly seat, slots in the floor of the container to receive said lug hooks, said lug hooks being shiftable in said slots by relative movement of said container and wheel assembly after the hook portion has passed through said slots, so that the hook portion of all of said lugs will overlie the floor, a keeper movable into at least one of said slots beside said lug hook when said hook portions overlie the floor, to prevent retractive movement of said lug in said slot, and biasing means for moving said keeper into said slot, and said container wall having an access adjacent said keeper for inserting a rod to move said keeper out of said slot.

2. In a shipping unit convertible to and from a highway vehicle, a container having a floor, top and walls, means substantially within the plane of the floor of the container for connecting the container to a tractor, a wheel assembly having a platform to receive the container, a plurality of lug hooks on said platform for detachably connecting the container to the platform, slots in the floor of the container to receive said lug hooks, said lug hooks being shiftable coincidentally in said floor slots by relative movement of said container and platform after the hook portions have passed through said floor slots so that the hook portion of all said lug hooks will overlie the floor of the container, at least one keeper pivotally mounted on a swingable arm interiorly of said container, said keeper being movable into one of said slots in said container floor to chock said lug hook when said hook portion overlies the floor and thereby holds all of said lug hooks against retractive movement, a slot in said platform adjacent said lug hook for said one slot in said floor whereby said keeper will pass through said one slot in the floor and said slot in said platform, and biasing means for moving said keeper into said one slot in said floor and slot in said platform, and said container wall having an access adjacent said keeper for inserting a rod to move said keeper out of said slot.

3. In a shipping unit convertible to and from a highway vehicle, a walled container having a floor, means for connecting the container to a tractor, a wheel assembly having a seat for the container for detachable connection to the container, a plurality of lug hooks on said wheel assembly seat, slots in the floor of the container to receive said lug hooks, said lug hooks being shiftable in said slots by relative movement of said container and wheel assembly after the hook portion has passed through said slots so that the hook portion of said lugs will coincidentally overlie the floor, a keeper pivotally mounted on a swingable arm movable into at least one of said slots to chock said lug hook when said hook portion overlies the floor to prevent retractive movement of said lug in said slot, said container wall having an inverted L-shaped keyway for the insertion of a rod to move said keeper out of said slot, and a block adjacent said swingable arm having its top in cooperative alignment with said keyway for supporting the innermost end of said rod when said swingable arm has been raised to move said keeper out of said slot.

4. In a shipping unit convertible to and from a highway trailer vehicle to be towed by a tractor having an upstanding fifth wheel pin, a walled container having a top and floor, a slot in the forward end of said floor to receive the pin of the tractor fifth wheel, a socket mounted on the inner surface of said floor and in communication with said slot to receive said pin, a wheel assembly having a seat for said container, a plurality of upstanding lug hooks on said seat, each of said lug hooks having a standard and a horizontal arm, a plurality of slots in said floor of said container to receive said lug hooks when said container is lowered on said wheel assembly seat, said lug hooks being shiftable in said slots when said container and said wheel assembly are moved relative to each other after said arm portions have passed through said slots so that the arm portion of all of said lug hooks will coincidentally overlie the floor, at least one keeper pivotally mounted within said container on a swingable arm movable into one of said slots to chock said lug hook when the arm portion of said lug hook overlies said floor to prevent retractive movement of all of said lug hooks in their respective slots, said container wall having an access adjacent said keeper arm for inserting a rod to move said keeper out of said slot, a plurality of circular caster openings in said floor, a plurality of ball caster sockets mounted on the inner surface of the floor of the container and each of said sockets in communication with one of said caster openings, and a ball caster in each of said caster sockets extending outwardly from said floor.

References Cited in the file of this patent

UNITED STATES PATENTS

| | | |
|---|---|---|
| 1,564,420 | Kirchner | Dec. 8, 1925 |
| 1,648,301 | Fitch | Nov. 8, 1927 |
| 2,369,384 | Zubatsky | Feb. 13, 1945 |
| 2,424,429 | Bamberg | July 22, 1947 |
| 2,656,196 | Fellabaum | Oct. 20, 1953 |
| 2,682,419 | Wolf | June 29, 1954 |
| 2,703,659 | Hutchins | Mar. 8, 1955 |